(12) United States Patent
Evans, Jr. et al.

(10) Patent No.: US 7,499,079 B2
(45) Date of Patent: Mar. 3, 2009

(54) MULTI-CAMERA IMAGE STITCHING FOR A DISTRIBUTED APERTURE SYSTEM

(75) Inventors: Daniel B. Evans, Jr., Ellicott City, MD (US); James Weygandt, Riva, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 753 days.

(21) Appl. No.: 11/082,837

(22) Filed: Mar. 18, 2005

(65) Prior Publication Data

US 2006/0066730 A1    Mar. 30, 2006

Related U.S. Application Data

(60) Provisional application No. 60/553,982, filed on Mar. 18, 2004.

(51) Int. Cl.
*H04N 5/225* (2006.01)
*H04N 5/228* (2006.01)

(52) U.S. Cl. .................. 348/218.1; 348/222.1

(58) Field of Classification Search .............. 348/218.1, 348/222.1
See application file for complete search history.

(56) References Cited

U.S. PATENT DOCUMENTS

| | | | |
|---|---|---|---|
| 5,016,109 A * | 5/1991 | Gaylord | 348/218.1 |
| 6,928,194 B2 * | 8/2005 | Mai et al. | 382/284 |
| 7,215,364 B2 * | 5/2007 | Wachtel et al. | 348/218.1 |
| 2002/0163582 A1 * | 11/2002 | Gruber et al. | 348/218.1 |
| 2002/0180727 A1 * | 12/2002 | Guckenberger et al. | 345/418 |

* cited by examiner

*Primary Examiner*—James M Hannett
(74) *Attorney, Agent, or Firm*—Andrews Kurth LLP

(57) ABSTRACT

Distributed Aperture Systems use multiple staring sensors distributed around a vehicle to provide automatic detection of targets, and to provide an imaging capability at all aspects. The sensor image data is "stitched" to make the camera joints transparent to the operator. For example, images from three different cameras may be combined into a single seamless mosaic. The output mosaic is suitable for rendering on a head-steered helmet mounted display or a multifunction console display.

26 Claims, 12 Drawing Sheets

US 7,499,079 B2

MULTI-CAMERA IMAGE STITCHING FOR A DISTRIBUTED APERTURE SYSTEM

PRIORITY APPLICATION

This application incorporates by reference and hereby claims the benefit of the following provisional application under 35 U.S.C. §119(e):

U.S. provisional patent application Ser. No. 60/553,982, entitled "MULTI-CAMERA SEAMLESS IMAGE STITCHING FOR A DISTRIBUTED APERTURE" filed on Mar. 18, 2004.

STATEMENT OF GOVERNMENT INTEREST

This invention was made with Government support under Contract N00421-00-C-308 awarded by the Department of Defense. The Government has certain rights in the invention.

FIELD OF THE INVENTION

This invention relates to combining images and more particularly to forming a mosaic image from a plurality of images. The plurality of images may be substantially simultaneously generated, for example with a distributed aperture system (DAS).

BACKGROUND OF THE INVENTION

The automatic stitching of high-resolution images into a single wide-field-of-view mosaic is a capability currently being developed by researchers with disparate applications. Software has been developed to enable users to form panoramic views from individual snapshots taken by digital cameras. Typically, this type of software is employed in a non-real-time, post-processing environment to generate panoramic images or image sequences for later playback.

However, this type of software cannot work in a real-time, high performance environment. For example, a high performance aircraft may be provided with a multiple cameras—infrared or visible light—generating a plurality of images simultaneously or substantially simultaneously. The cameras can be distributed to provide a very wide angle of coverage. For example, six (6) cameras may provide $4\pi$ steradian coverage of the world exterior to the aircraft and a portion of may be presented to the pilot with the use of a helmet mounted display (HMD). The challenge is to create a mosaic output image from multiple cameras real-world-registered to the pilot view direction with the imagery as seamless and uniform as possible across camera boundaries.

SUMMARY OF THE INVENTION

In accordance with a first aspect of the invention, a method to combine a plurality of images into a seamless mosaic includes determining a virtual line-of-sight (LOS) and a corresponding field-of-view (FOV) of an output mosaic; obtaining a plurality of input images, wherein each image of the plurality of input images contributes to at least one output mosaic pixel; and mapping contributions from the plurality of input images for each output mosaic pixel.

In accordance with a second aspect of the invention, an apparatus for combining a plurality of images into a seamless mosaic includes a control processor for determining a virtual line-of-sight (LOS) and a corresponding field-of-view (FOV) of an output mosaic based on external input; a plurality of imaging sensors for generating a corresponding plurality of input images, wherein each image of the plurality of input images contributes to at least one output mosaic pixel of the output mosaic; and an image processor for mapping contributions from the plurality of input images for each output mosaic pixel.

BRIEF DESCRIPTION OF THE DRAWINGS

Features and advantages of the invention will become apparent to those skilled in the art from the following description with reference to the drawings, in which.

DETAILED DESCRIPTION

For simplicity and illustrative purposes, the principles of the invention are described by referring mainly to exemplary embodiments thereof. However, one of ordinary skill in the art would readily recognize that the same principles are equally applicable to many types image stitching devices and methods. Also, the terms "optical", "camera", "sensor", "image" and the like are not to be limited to the visible spectrum. It is fully intended that non-visible spectrum— such as infrared, radar, or ultra-violet—images are to be included within the claim scope.

Figure 1:
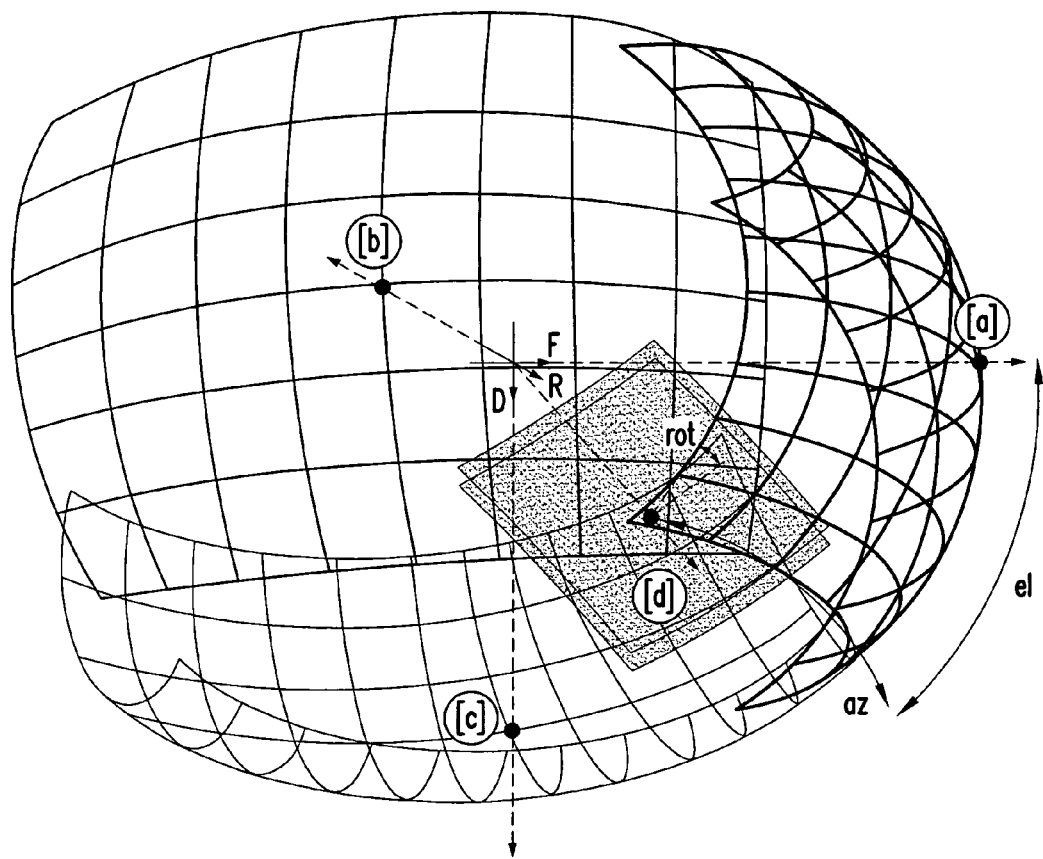
FIG. 1 illustrates a multi-camera image stitch geometry according to an embodiment of the present invention.

An example stitching algorithm geometry is provided in FIG. 1, which illustrates a spherical space in which the algorithm operates. The sphere represents an entire 4π steradian area covered, for example by a distributed aperture system (DAS). The DAS cameras, providing a plurality of simultaneous input images, may be positioned at the center of the sphere (coordinate system origin). In this instance, there may be three cameras providing the simultaneous input images. An arbitrary pointing direction or line-of-sight (LOS) for each camera—corresponding to an input image—can be described. The LOS may be described in multiple coordinate systems. An example is in Cartesian coordinates forward, right, and down (FRD). Another example is in Euler coordinate angles azimuth, elevation, and rotation (AZ, EL, ROT).

The three DAS cameras may be set such that the optical LOSs are set off 90 degrees relative to each other. These correspond to LOS vectors in FRD of [1, 0, 0], [0, −1, 0], and [0, 0, 1]. In other words, the LOS vectors are such that first view is straight forward (point [a]), second view is straight left (point [b]), and the third is straight down (point [c]), respectively. The camera field-of-views (FOV) may exceed 90×90 degrees to allow for image overlap between adjacent cameras or views.

It is intended that the LOSs of the plurality of input images can be other than purely orthogonal. It is generally sufficient the FOV of the neighboring input images are adjacent each other for seamless stitching of images. For robust and reliable operation, it is preferred that the neighboring input images have FOVs that overlap each other. For example, the FOV of the cameras in FIG. 1 may be 94×94 degrees. This allows for 4 degrees of overlap between the FOVs of neighboring cameras.

Figure 2:
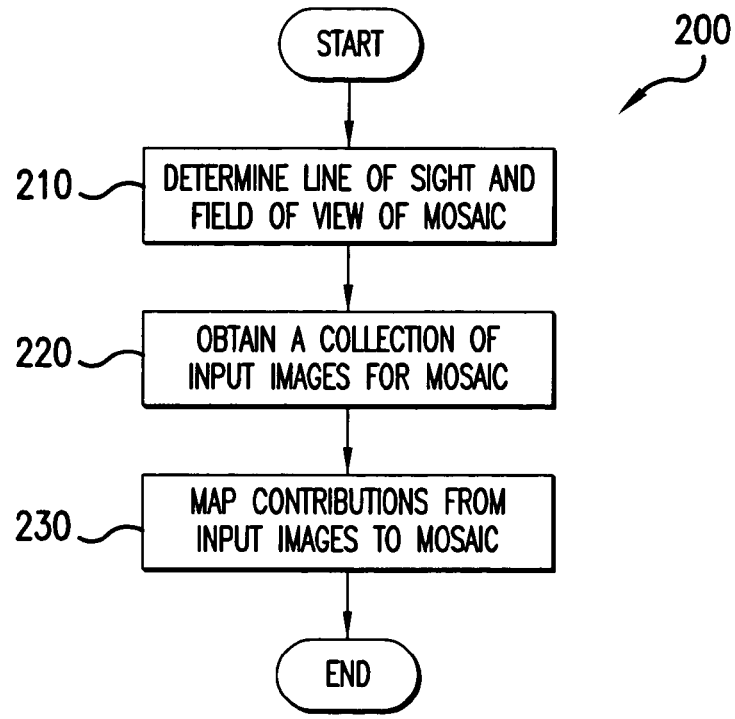
FIG. 2 illustrates an exemplary seamless stitching algorithm according to an embodiment of the present invention.

FIG. 1 also illustrates the LOS and FOV of a mosaic view (desired view) to be extracted and stitched for presentation on a video display (area [d]). The display LOS vector may be specified in Euler AZ, EL, ROT angles as shown. An exemplary stitching algorithm 200 is illustrated FIG. 2. Generally, the algorithm may be described as including the following steps. First, the virtual (desired) line-of-sight and field-of-view of the output mosaic may be determined (step 210). For example, the desired LOS and FOV specifications may be received via movement of the helmet mounted display HMD from a pilot. The specifications may also be received through a joy stick, computer mouse, game controller, or any other interfaces available. Needless to say, the LOS and FOV specification may be received through a variety of ways.

Then a collection of input images, for example from multiple cameras, may be obtained to generate the output mosaic (step 220). Finally, contributions to the output mosaic from the collection of input images may be mapped to arrive at the output mosaic (step 230).

It is preferred that each input image in the collection should contribute to at least one pixel of the output mosaic. Further, the input images in the collection may be simultaneously or substantially simultaneously captured. Then the output mosaic generated also represents a composite image at a particular moment in time. One method to capture images simultaneously is to operate multiple imaging sensors simultaneously.

As noted above, in step 210, the LOS and FOV of the output mosaic may be determined. In other words, the output mosaic view coordinate system (or display view coordinate system) may be established. As an example, the display view coordinate system may be a spherical, uniform radius AZ/EL system established for a defined incremental FOV (IFOV) spacing between adjacent pixels and a defined FOV of array size ($N_r \times N_c$), where $N_r$ is the number of rows and $N_c$ is the number of columns of the output mosaic array. The display pixel IFOV may be adjusted to achieve a desired zoom ratio. The following parameters, which may be externally supplied, may be used to determine the spatial position ($AZ_{viewpixel}$, $EL_{viewpixel}$) of each output array pixel relative to the display center of the output mosaic (step 302). The parameters may include:

Output array size in number of rows and columns ($N_r$, $N_c$);
Output mosaic display pixel IFOV; and
Desired zoom factor.

Figure 3A:
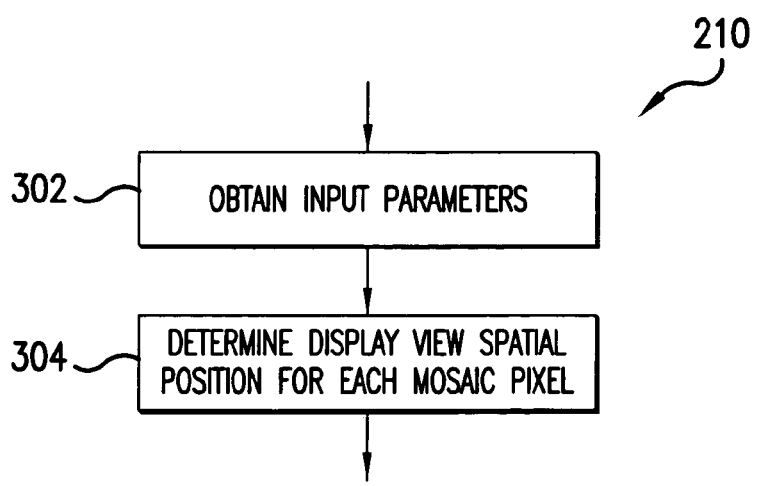
FIG. 3A illustrates a processing of for determining the line-of-sight and field-of-view of an output display view according to an embodiment of the present invention.

In short, with the parameters, the output mosaic's LOS and FOV may be fully determined. FIG. 3A illustrates an exemplary detailed processing of step 210 of FIG. 2 to determine the LOS and FOV of the output display view. First, the parameters may be obtained (step 302), for example from a user. As noted, these parameters may include the output array size, the display pixel IFOV, and a desired zoom factor.

From this, the display view spatial position of each output mosaic pixel relative to the display center may be determined ($AZ_{viewpixel}$, $EL_{viewpixel}$) may be calculated (step 304) as follows:

$$AZ_{viewpixel}(r, c) = \text{zoom\_factor} * \text{display\_IFOV} * \left[c - \left(\frac{N_c}{2}\right) + 0.5\right] \quad (1)$$

$$EL_{viewpixel}(r, c) = \text{zoom\_factor} * \text{display\_IFOV} * \left[r - \left(\frac{N_r}{2}\right) + 0.5\right] \quad (2)$$

$$RadDist_{viewpixel}(r, c) = \cos^{-1}[\cos(AZ_{viewpixel}(r, c)) * \cos(EL_{viewpixel}(r, c))] \quad (3)$$

where $AZ_{viewpixel}(r,c)$ represents the azimuth of the output pixel at position (r, c), $EL_{viewpixel}(r,c)$ represents the elevation of the output pixel at position (r, c), and $RadDist_{viewpixel}(r,c)$ represents the radial distance of the output pixel at position (r, c) from the display center.

Figure 3B:
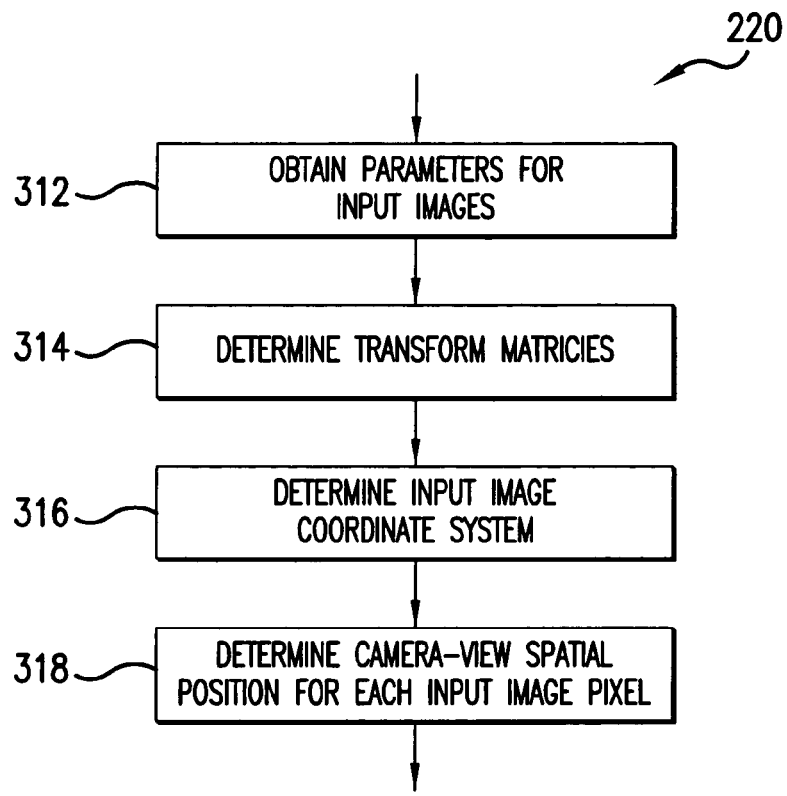
FIG. 3B illustrates a processing for transforming a display-view coordinate system to a camera-view coordinate system according to an embodiment of the present invention.

To obtain the collection of input images for the mosaic (step 220 of FIG. 2), it is preferred that the display-centered coordinate system be transformed to the coordinate system of the input images, which will be termed as "camera-centered" coordinate system. It is preferred that the transform takes place for each input image. The process may include computing one or more transformation matrices so that the appropriate transformation may take place. FIG. 3B illustrates an exemplary processing of this transformation process. Note the process may be repeated for each camera-centered (input image) coordinate system.

First, parameters may be obtained to compute the transformation matrices (step 312) for each input image, for example from a user. In this particular instance, the parameters may be the parameters of the cameras used to generate the image. The parameters may include LOS of the camera ($AZ_{cam}$, $EL_{cam}$, $ROT_{cam}$), the FOV of the camera ($Nrows_{cam}$, $Ncols_{cam}$), the, camera pixel IFOV, and an optical distortion function $f\theta$. While there may be multiple causes of the optical distortion, one primary source of the distortion may be due to a lens distortion of the camera. Thus, it may also be described as a camera distortion $f\theta$. The parameters may also include the display view LOS ($AZ_{view}$, $EL_{view}$, $ROT_{view}$) determined above.

Next, the transformation matrices required to translate from the display-centered to the camera-centered coordinate systems may be computed (step 314). In this particular example, two 3×3 transform matrices (VIEWtoINS, CAMtoINS) may be calculated as follows:

$$VIEWtoINS = \begin{bmatrix} (Ce*Ca) & (Ce*Sa) & (-Se) \\ (Sr*Se*Ca)-(Cr*Sa) & (Sr*Se*Ca)+(Cr*Sa) & (Sr*Ce) \\ (Cr*Se*Ca)+(Sr*Sa) & (Cr*Se*Sa)-(Cr*Ca) & (Cr*Ce) \end{bmatrix} \quad (4)$$

where
$$Sa = \sin(AZ_{view}) \quad Ca = \cos(AZ_{view})$$
$$Se = \sin(EL_{view}) \quad Ce = \cos(EL_{view})$$
$$Sr = \sin(ROT_{view}) \quad Cr = \cos(ROT_{view})$$

and $$CAMtoINS = \begin{bmatrix} (Ce*Ca) & (Ce*Sa) & (-Se) \\ (Sr*Se*Ca)-(Cr*Sa) & (Sr*Se*Ca)+(Cr*Sa) & (Sr*Ce) \\ (Cr*Se*Ca)+(Sr*Sa) & (Cr*Se*Sa)-(Cr*Ca) & (Cr*Ce) \end{bmatrix} \quad (5)$$

where
$$Sa = \sin(AZ_{cam}) \quad Ca = \cos(AZ_{cam})$$
$$Se = \sin(EL_{cam}) \quad Ce = \cos(EL_{cam})$$
$$Sr = \sin(ROT_{cam}) \quad Cr = \cos(ROT_{cam})$$

"INS" refers to the world coordinate system that the view display LOS and each camera LOS is referenced to. That is, the coordinate system shown in FIG. 1. For example, on an aircraft, the frame of reference may be with respect to the on-board Inertial Navigation System (INS). A magnetic head tracker generating the view display LOS may be aligned to the INS coordinate system. Each camera mounting position can be surveyed with respect to the INS coordinate system to establish the camera's LOS.

Next, a camera coordinate system may be established for each camera (step 316). Like the output mosaic display view, these coordinate systems may be spherical with uniform radius AZ/EL systems established for a defined IFOV spacing between adjacent pixels and a defined FOV of array size (NrowsCam, NcolsCam). The camera pixel IFOV may be the effective IFOV of the output camera imagery (images used to determine the mosaic).

For the purposes of explanation only, the cameras may be assumed to have identical device properties. In other words, the three cameras are assumed to have identical FOV, IFOV, and lens distortion $f\theta$. The difference then is the LOS, i.e. the pointing direction, of each camera.

However, it should be noted that the device parameters of the cameras may be different and still be within the scope of the invention.

Figure 3C:
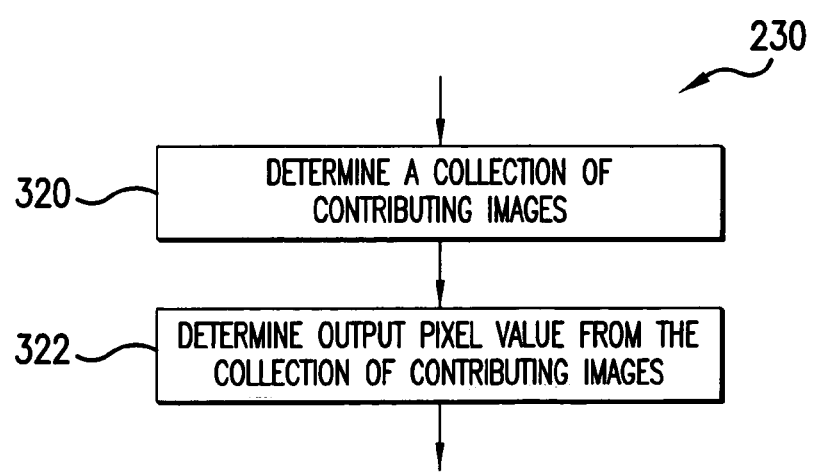
FIG. 3C illustrates a processing for mapping contributions from input images to arrive at the output display view according to an embodiment of the present invention.

Next, the contributions from the input images may be mapped to the output mosaic pixels to arrive at the output mosaic as noted above (step 230 in FIG. 2). FIG. 3C illustrates an exemplary processing to carryout step 230. The processing may be described as: 1) determining a collection of potential contributing input images for the output pixel of interest (step 320); and 2) determining the mosaic pixel value based on the contributing input images (step 322). Note that the process illustrated in FIG. 3C is repeated for each mosaic output pixel ($AZ_{viewpixel}$(r_idx, c_idx), $EL_{viewpixel}$(r_idx, c_idx)).

Figure 4:
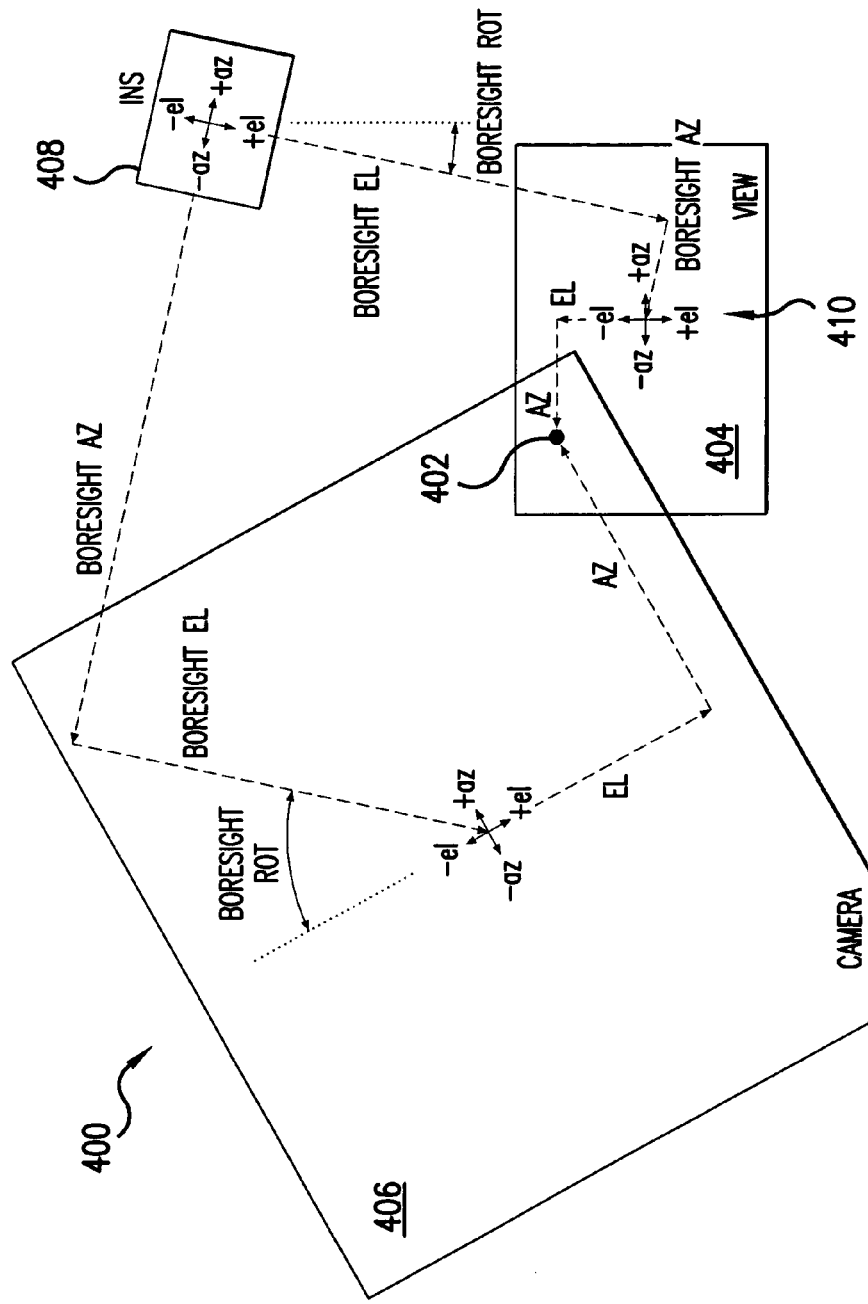
FIG. 4 illustrates a diagram of a coordinate transformation process for translating pixels from a display-view-centered coordinate system to a camera-centered coordinate system according to an embodiment of the present invention.

Regarding step 320, an input image may potentially be a contributor to a particular output mosaic pixel if the output mosaic pixel is within the input image. This is explained with reference to FIG. 4. In FIG. 4, there is a output mosaic display view 404 and a camera view 406. The camera view 406 corresponds to a particular input image. As shown, the output mosaic pixel 402 is within the camera view 406. Thus, in this instance, the camera view 406 may be a potential contributor to determine the value of the output display pixel 402.

On the other hand, the camera view 406 cannot contribute to determine the value of the output mosaic pixel 410 since the pixel 410 lies entirely outside of the camera view 406.

The process to determine whether an input image can be a contributor to a particular output mosaic pixel may begin by first applying coordinate rotation transformation to the output pixel position ($AZ_{viewpixel}$, $EL_{viewpixel}$) to locate the corresponding AZ/EL position ($AZ_{cam\_pixel}$, $EL_{cam\_pixel}$) with respect to the particular camera view 406. In other words, the coordinate transformation translates the output mosaic pixel from a display-view-centered coordinate system to a camera-centered coordinate system as illustrated in FIG. 4. In FIG. 4, the display view pixel 402 may be transformed from the display-view-centered coordinate system 404 to the camera-centered coordinate system 406.

Figure 5:
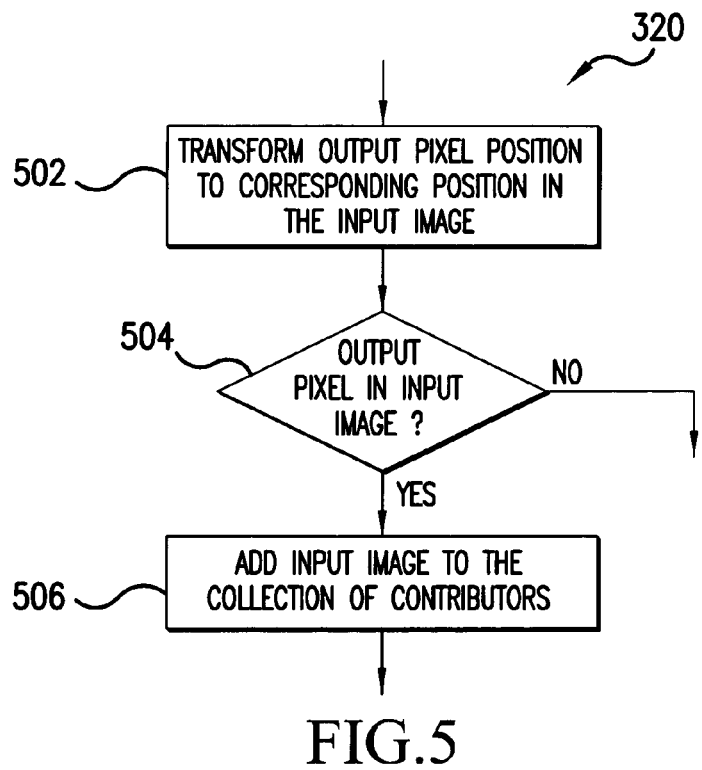
FIG. 5 illustrates a flow chart to determine a collection of contributing images to an output mosaic pixel according to an embodiment of the present invention.

FIG. 5 illustrates this process of determining whether an input image can contribute to the output mosaic pixel. To accomplish this task, for each output pixel, the position of the output pixel is translated to the corresponding position in the camera view 406, as described above (step 502).

Figure 6A:
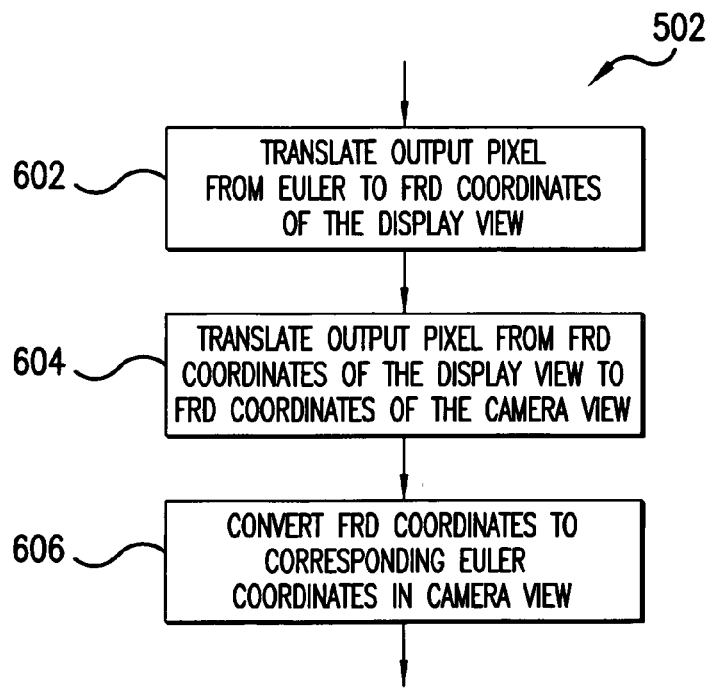
FIG. 6A illustrates a flow chart to translate an output pixel position from the output display view to the corresponding location in the camera view according to an embodiment of the present invention.

In one embodiment, the translation may be accomplished as follows. First, the output mosaic pixel position in Euler AZ/EL ($AZ_{viewpixel}$, $EL_{viewpixel}$) coordinates may be converted to the corresponding Cartesian FRD coordinates ($F_{view}$, $R_{view}$, $D_{view}$) still within the display view coordinates system (step 602 of FIG. 6A) as follows:

$$L = RadDist_{view\_pixel} \quad (6)$$

$$F_{view} = \cos(L) \quad (7)$$

$$R_{view} = AZ_{view\_pixel} * \left[\frac{\sin(L)}{L}\right] \quad (8)$$

$$D_{view} = EL_{view\_pixel} * \left[\frac{\sin(L)}{L}\right] \quad (9)$$

The display-view-centered FRD vector of the output mosaic pixel may be transformed to a selected camera-centered FRD vector via a two-stage rotational transform process—transforming from display-view-centered 404 to INS-centered 408 and then to camera-centered 406 coordinate system (step 604). The following matrix multiplication may be used:

$$\begin{bmatrix} F_{cam} \\ R_{cam} \\ D_{cam} \end{bmatrix} = \begin{bmatrix} CAMtoINS \\ (3 \times 3) \end{bmatrix}^{-1} * \begin{bmatrix} VIEWtoINS \\ (3 \times 3) \end{bmatrix} * \begin{bmatrix} F_{view} \\ R_{view} \\ D_{view} \end{bmatrix} \quad (10)$$

FIG. 4 illustrates this two-stage process via the INS 408. Ambiguity may be eliminated by rejecting any calculated FRD coordinates with $F_{cam} < 0$. This may occur when one tries to transform to a camera that is actually pointing behind. Upon this condition, the camera may be eliminated from consideration as a contributor to the output mosaic pixel being processed.

The computed camera Cartesian FRD coordinates may be then converted to corresponding Euler AZ/EL angles ($AZ_{campixel}$, $EL_{campixel}$) (step 606) within the camera-centered coordinate system. This conversion may take into account the distortion function $f\theta$, which can alter the final result based on the sensor optics. The distortion may be switched in or out via configuration settings. If no distortion is incorporated, the closed form of the conversion becomes:

$$AZ_{campixel} = \left[\frac{\cos^{-1}(F_{cam})}{\sqrt{1-F_{cam}^2}}\right] * R_{cam} \qquad (11)$$

$$EL_{campixel} = \left[\frac{\cos^{-1}(F_{cam})}{\sqrt{1-F_{cam}^2}}\right] * D_{cam} \qquad (12)$$

In the vicinity where $F_{cam}=1$, a singularity occurs. To eliminate the singularity problem, a finite series approximation may be utilized as follows:

$$AZ_{campixel} = [1.543858 - 0.83776*F_{cam} + 0.377929*F_{cam}^2 - 0.084041*F_{cam}^3] * R_{cam} \qquad (13)$$

$$EL_{campixel} = [1.543858 - 0.83776*F_{cam} + 0.377929*F_{cam}^2 - 0.084041*F_{cam}^3] * D_{cam} \qquad (14)$$

The distortion $f\theta$ specifications can be incorporated into the transform to arrive at a spatially accurate result. The distortion $f\theta$ specifications may be incorporated by determining a $3^{rd}$ order polynomial curve to fit to the distortion function and modifying the polynomial coefficients as appropriate.

Figure 4A:
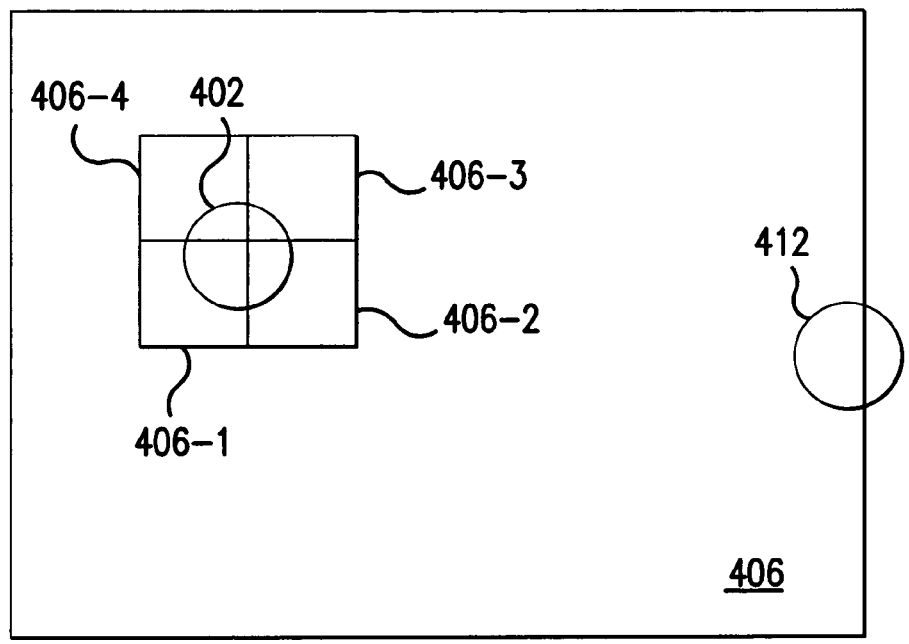
FIG. 4A illustrates a concept of contributing pixels from an input image to the output pixel of the output mosaic.

Referring back to FIG. 5, the computed AZ/EL angles ($AZ_{campixel}$, $EL_{campixel}$) may be used to determine if the output mosaic pixel is within the camera view (step 504). Whether a particular output mosaic pixel is "within" the input image may be determined in multiple ways. Though very small in size, each output mosaic pixel can be regarded as having a finite area—equivalent to the view display row dimension FOV divided by the number of pixel rows in the output mosaic. This pixel FOV extent is known as the incremental FOV or IFOV. Although not a requirement, output mosaic pixels are usually square to achieve a 1:1 aspect ratio in the output image. As illustrated in FIG. 4A, the output pixel 402 (illustrated as a circle) does have a size equal to the IFOV. If the entirety of the output pixel 402 is inside the camera view 406, the output pixel 402 may be considered to be "within" the camera view 406.

However, the output mosaic pixel 412 overlaps only a portion of the camera view 406. This can occur since the mapping of the output mosaic pixels to the input image pixels is not likely to be exactly corresponding. Depending on various factors, such partially overlapping output pixel may be considered to be within the camera view 406 or not.

In any case, the spatial position of the output mosaic pixel in relation to the camera view can be described as determining an incremental LOS and incremental FOV of the output mosaic pixel in the camera view 406 coordinate system. The incremental LOS provides the position of the center of the output pixel and the incremental FOV provides the extension from the center.

One particular method to determine whether the computed AZ/EL position ($Az_{campixel}$, $EL_{campixel}$) of the output mosaic pixel is "within" is to compare the computed position to the FOV extent of the camera view 406. This amounts to determining whether the center of the output mosaic pixel lies within the camera FOV.

If the computed AZ/EL angles lie outside the camera FOV, the camera, and thus the corresponding input image, may be eliminated as a contributor to the output mosaic pixel ($AZ_{viewpixel}$(r_idx, c_idx), $EL_{viewpixel}$(r_idx, c_idx)) presently being processed. For example, with reference to FIG. 4, the pixel 410 within the display view 404 is outside of the camera view 406. This is simply a realization that not all cameras (or input images) contribute to every pixel of-the output mosaic.

On the other hand, if the computed AZ/EL angles lie within the camera FOV (see pixel 402), the camera ID (in this instance the camera corresponding to the camera view 406) and the computed array row/column address or addresses may be stored for further use (step 506).

It bears repeating that the steps illustrated in FIG. 5 are repeated for each camera view. When this process completes, i.e. when step 320 completes (see FIG. 3C) the particular output mosaic pixel will have zero or more contributing images. Referring back to FIG. 3C, when the collection of potentially contributing input images are determined in step 320, then the value of the output mosaic pixel may be determined based on the collection of contributing images (step 322).

For a particular output mosaic pixel of interest, it may be that more than one pixel of a contributing input image may be able contribute to the output value. For example in FIG. 4A, the IFOV (or area) of the mosaic pixel 402 may overlap portions of multiple of pixels of the camera view 406. One way to account for the overlap is to determine the contribution weights of the overlapped pixels of the input image in some manner and determining the contributions of the multiple pixels based on their corresponding weights.

To illustrate, the pixel 402 of the display view 404 (represented as a circle in FIG. 4A) overlaps portions of four pixels 406-1, 406-2, 406-3, and 406-4 of the camera view 406 (represented as squares in FIG. 4A). When this occurs, the contributions of the pixels 406-1 to 406-4 may be taken into account. For example, the contribution of the camera view 406 to the output pixel 402 may simply be an average value of the overlapped pixels. As another example, the contribution weights of the pixels 406-1 to 406-4 may depend on the amount of overlap.

Figure 6B:
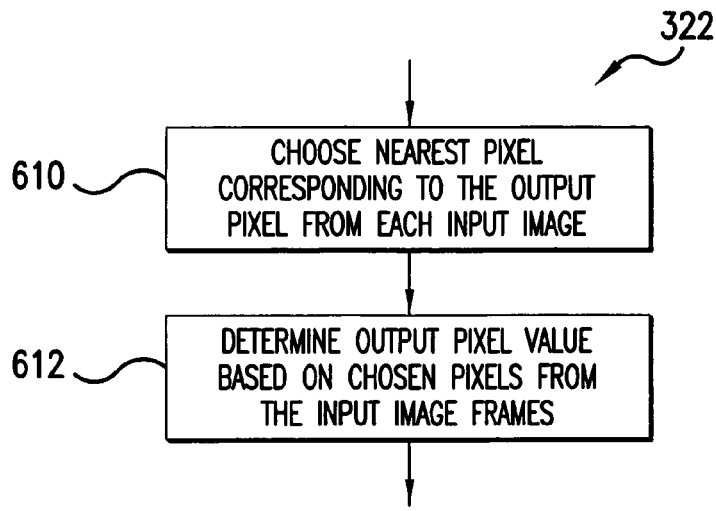
FIG. 6B illustrates a flow chart to populate an output pixel position based on pixels of the input images according to an embodiment of the present invention.

FIG. 6B illustrates an alternative method, which is to choose a single pixel—the nearest pixel—from the candidate camera view as the contributing pixel (step 610) for that camera view (input image). In other words, the camera view pixel closest to the calculated AZ/EL angles ($Az_{campixel}$, $EL_{campixel}$) may be chosen to contribute to the output mosaic. Again referring to FIG. 4A, the mosaic pixel 402 overlaps the camera view pixel 406-1 the most. To put it another way, the center of the mosaic pixel 402 is within the camera view pixel 406-1. Thus, the camera view pixel 406-1 may be considered to be the nearest pixel.

The array row/column address of the contributing camera pixel may be derived from the computed AZ/EL angle using the camera IFOV as follows:

$$c(AZ_{campixel}, EL_{campixel}) = \qquad (15)$$
$$\mathrm{round}\left\{\left[\frac{EL_{campixel}}{\mathrm{camera\_IFOV}}\right] + \left(\frac{Ncols_{Cam}}{2}\right) - 0.5\right\}$$

$$r(AZ_{campixel}, EL_{campixel}) = \qquad (16)$$
$$\mathrm{round}\left\{\left[\frac{AZ_{campixel}}{\mathrm{camera\_IFOV}}\right] + \left(\frac{Nrows_{Cam}}{2}\right) - 0.5\right\}$$

The above process may be repeated for each camera in the DAS system. Upon completion, a collection of candidate camera (potential contributing input images) and their contributing pixel/row addresses may be compiled for further use. Based on the spatial geometry illustrated in FIG. 1, one, two, or all three cameras may potentially contribute to a given pixel in the output mosaic.

Figure 7:
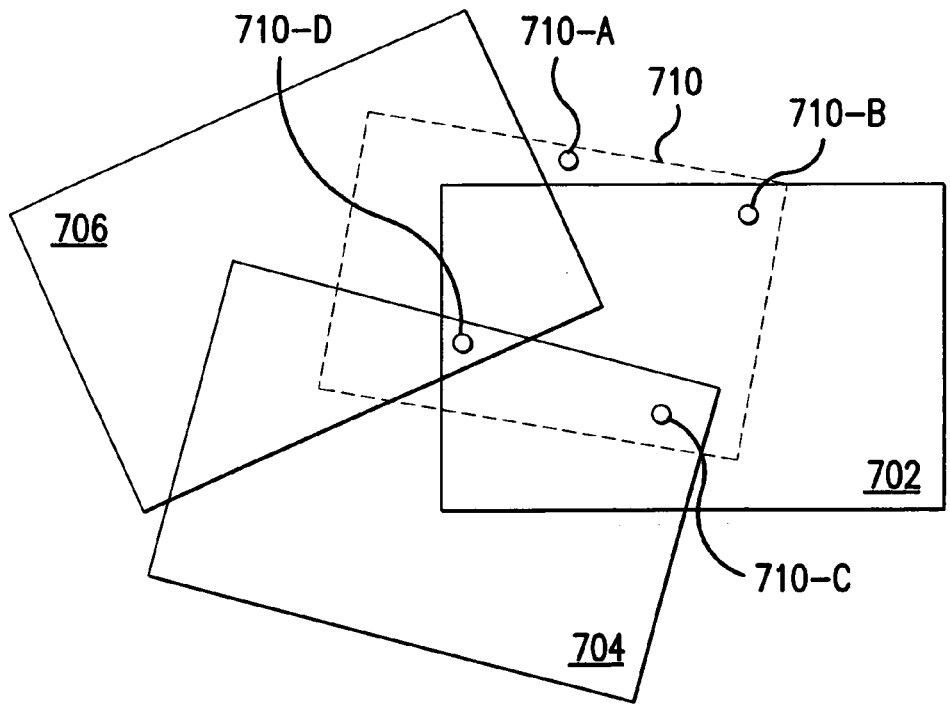
FIGS. 7 and 7A illustrate possible contributions to an output pixel from multiple input images according to an embodiment of the present invention.
Figure 7A:
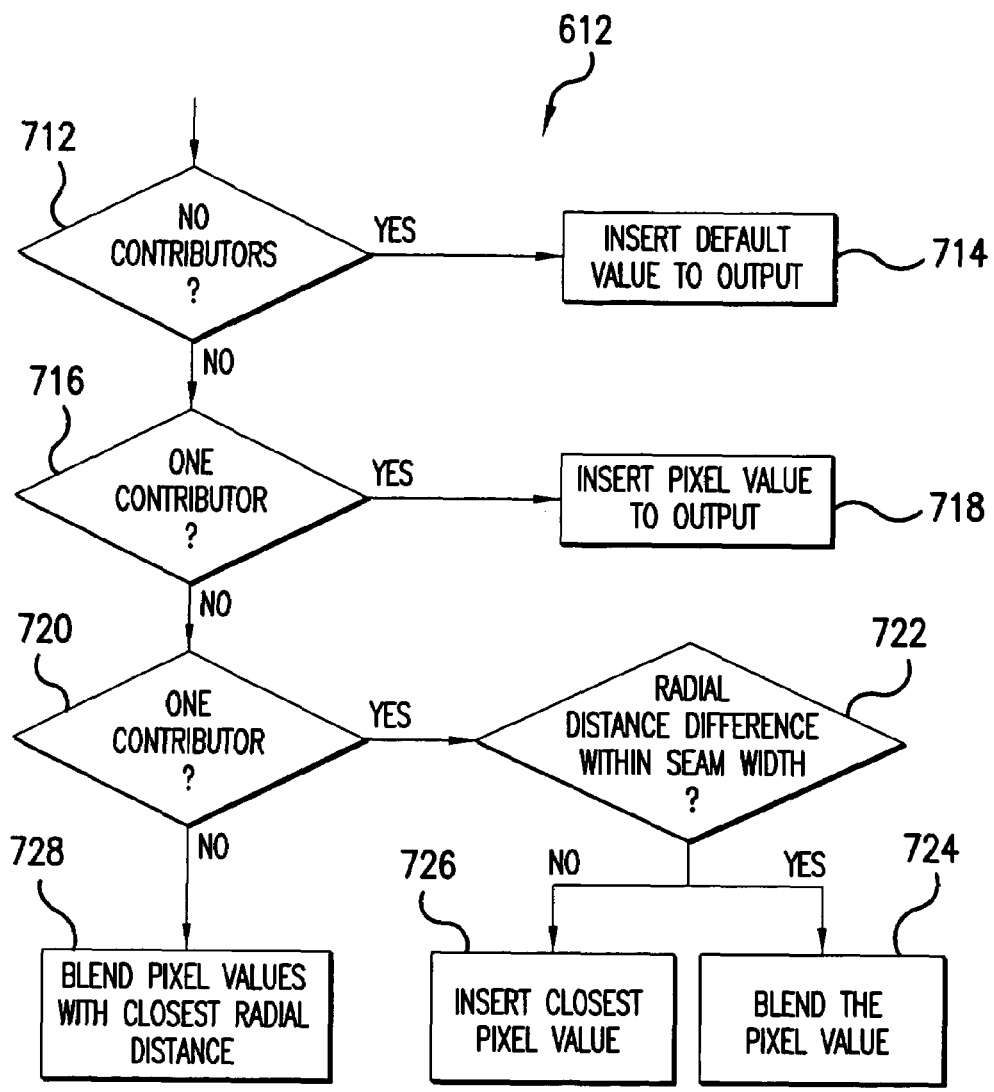

Next, the value of the output mosaic pixel under consideration may be determined (step 612). In addition to FIG. 6B, the explanation is provided with reference to FIGS. 7 and 7A. In FIG. 7, the contributing input images, i.e. camera views 702, 704, and 706 (in solid lines) may contribute to construct the output mosaic display view 710 (in dashes).

Processing may be dependent on the number of candidate pixels passing the criteria. For example, it may be that the output mosaic pixel encompasses an area where no contributing pixels exist (step 712). As an example, the output pixel 710-A is in an area that does not overlap with any of the camera views 702, 704, and 706. This situation may also be caused by a failed imaging sensor. For example, if the camera: generating the image view 702 fails, then the output pixel 710-B would have no contributors as well. If no contributing pixels exist, then a predetermined pixel value may be inserted for the output mosaic pixel (step 714).

The output mosaic pixel may overlap a single camera (step 716). For example, the pixel 710-B only overlaps the contributing image view 702. When this occurs, then the value of the selected camera pixel, i.e. the nearest pixel to the position ($AZ_{cam\_pixel}$, $EL_{cam\_pixel}$), may be inserted directly into the output pixel at position ($AZ_{viewpixe}$(r_idx, c_idx), $EL_{viewpixel}$(r_idx, c_idx)) (step 718).

The output mosaic pixel may overlap two cameras (step 720). In FIG. 7, pixel 710-C overlaps both contributing image views 702 and 704. If the output mosaic pixel overlaps two cameras, then the selected camera pixels from both contributing cameras ($AZ_{cam\_pixel}$, $EL_{cam\_pixel}$) may be blended or feathered to produce a "seamless" appearance in the final image or a value. As an example, the value of the output mosaic pixel may simply be determined by averaging the values of the two contributors. As another example, the contributing values may be weighted according to one or more properties.

However, depending on the circumstance, one of the contributing images may be removed as a contributor and the value of the selected pixel of the remaining contributing image may be inserted as the value of the output mosaic pixel, much like the situation with a single contributor scenario discussed above.

Figure 8:
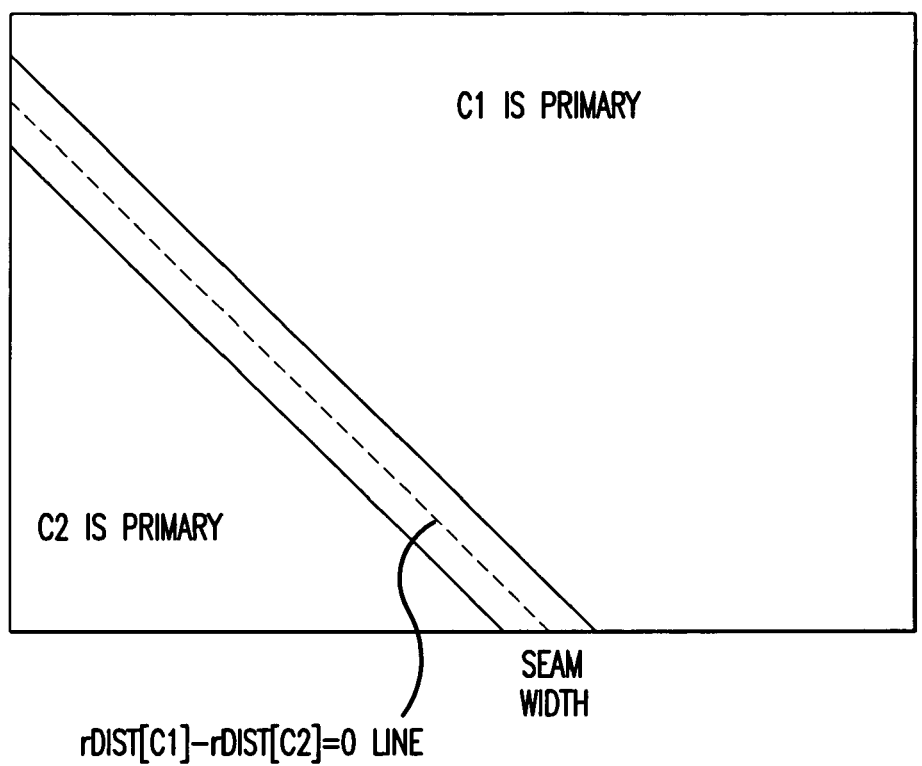
FIG. 8 illustrates a seam region in a portion of an image carried out by a feathering operation in accordance with an embodiment of the present invention.

The decision to remove a camera as a contributor may be based on a computed radial distance of each selected pixel to its corresponding camera-centered coordinate system origin and a seam width factor $\epsilon$ (step 722). As illustrated in FIG. 8, the contributing camera with the smaller radial distance may be designated as the "primary" contributor and the contributing camera with the larger radial distance may be designated as the "secondary" contributor. Pixel blending/feathering may occur when the difference of the computed radial distances of the contributing pixels is less than or equal to $\epsilon$ as seen in FIG. 5 (step 724) where $\epsilon$ represents a predetermine difference threshold.

If the computed difference is greater than $\epsilon$, the value of the selected pixel of the primary camera may be simply inserted as the value of the output mosaic pixel at position ($AZ_{viewpixel}$(r_idx, c_idx), $EL_{viewpixel}$(r_idx, c_idx)) (step 726). The rationale to remove the secondary contributor may be that the the amount of spatial overlap of 2 adjacent cameras exceeds the desired seam width $\epsilon$.

The concept described may be represented mathematically/logically as follows:

$$L_{campixel(primary)} = \cos^{-1}[\cos(AZ_{campixel(primary)}) * \cos(EL_{campixel(primary)})] \quad (17)$$

$$L_{campixel(secondary)} = \cos^{-1}[\cos(AZ_{campixel(secondary)}) * \cos(EL_{campixel(secondary)})] \quad (18)$$

$$\Delta L = L_{campixel(secondary)} - L_{campixel(secondary)} \quad (19)$$

$$\text{if } (\Delta L \leq \epsilon) \{\text{blend}\}, \text{else}\{\text{useprimary}\} \quad (20)$$

If pixel blending is selected, then the blended value may represent a weighted contribution of the contributors. For example, the weight may be based on the respective radial distances as follows:

$$I_{viewpixel}(r\_idx, c\_idx) = W_{primary} * I_{primary}(AZ, EL) + W_{secondary} * I_{secondary}(AZ, EL) \quad (21)$$

where $I_{viewpixel}$(r_idx, c_idx) is the value of the output pixel at output pixel position (r_idx, c_idx), $$W_{primary} = 0.5 + 0.5\left[\frac{\Delta L}{\epsilon}\right]$$

is the calculated contribution weight of the primary contributing image, $$W_{secondary} = 0.5 - 0.5\left[\frac{\Delta L}{\epsilon}\right]$$

is the calculated contribution weight of the secondary contributing image, $I_{primary}$(AZ,EL) is the value of the selected pixel of the primary contributing image, and $I_{secondary}$(AZ, EL) is the value of the selected pixel of the secondary contributing image.

Once computed, the blended pixel value may be inserted into the mosaic output position ($AZ_{viewpixel}$(r_idx, c_idx), $EL_{viewpixel}$(r_idx, c_idx)).

There may be more than two input images potentially contributing to the output mosaic pixel, i.e. the output mosaic pixel may overlap more than two cameras (NO result in step 720). Again referring to FIG. 7, pixel 710-D overlaps all three contributing input image views 702, 704, and 706. Multiple ways exist to determine the value of the output mosaic pixel. One way is to average the values of all contributors. Another way is to weight the contributions of the input images based on some criteria.

Yet another way is to eliminate one or more input images as contributors. For example, FIGS. 1 and 2, the output mosaic pixel positions corresponding to the three-camera seam overlap a corner area, i.e. all three cameras may potentially contribute. Also see pixel point 710-D in FIG. 7.

In this instance, the selected camera pixels from the contributing cameras may be sorted by radial distance from their respective camera-centers. The input image view with the pixel position having greatest radial distance may be eliminated, and the two remaining contributing input image views whose pixel positions have the smallest radial distances from center may be blended as described above (step 728). Eliminating the pixels in this manner results in a simpler calculation without much loss of accuracy. The blended value may be inserted into the mosaic output position ($AZ_{viewpixel}$(r_idx, c_idx), $EL_{viewpixel}$(r_idx, c_idx)).

The operations described above may be repeated for each output mosaic pixel position ($AZ_{viewpixel}$(r_idx, c_idx), $EL_{viewpixel}$(r_idx, c_idx)), wherein $0 \leq r\_idx \leq N_r$ and $0 \leq c\_idx \leq N_c$. Once all positions of the output mosaic are processed, the mosaic is complete.

Figure 9:
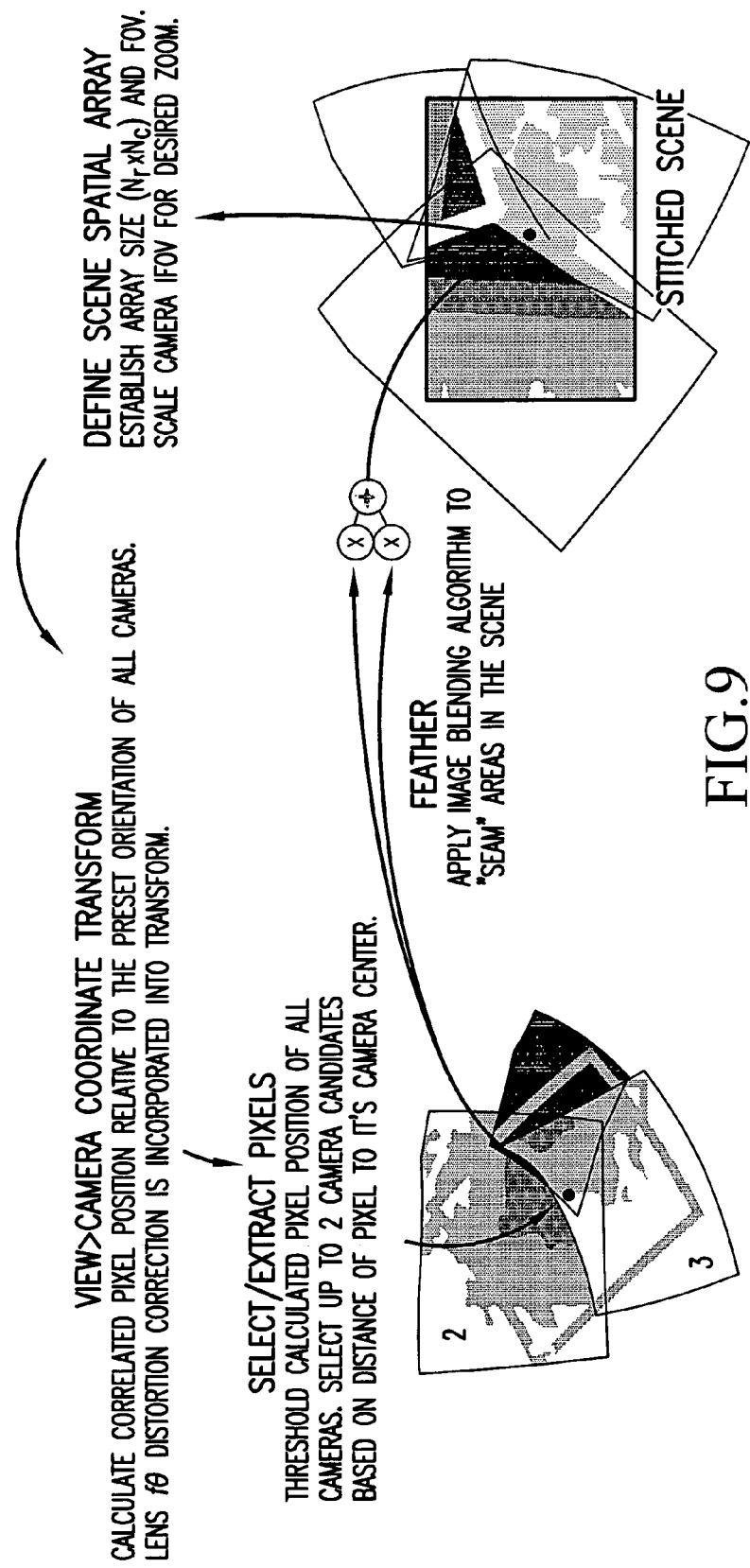
FIG. 9 illustrates a process to stitch an output mosaic from a plurality of input images according to an embodiment of the present invention.
Figure 10:
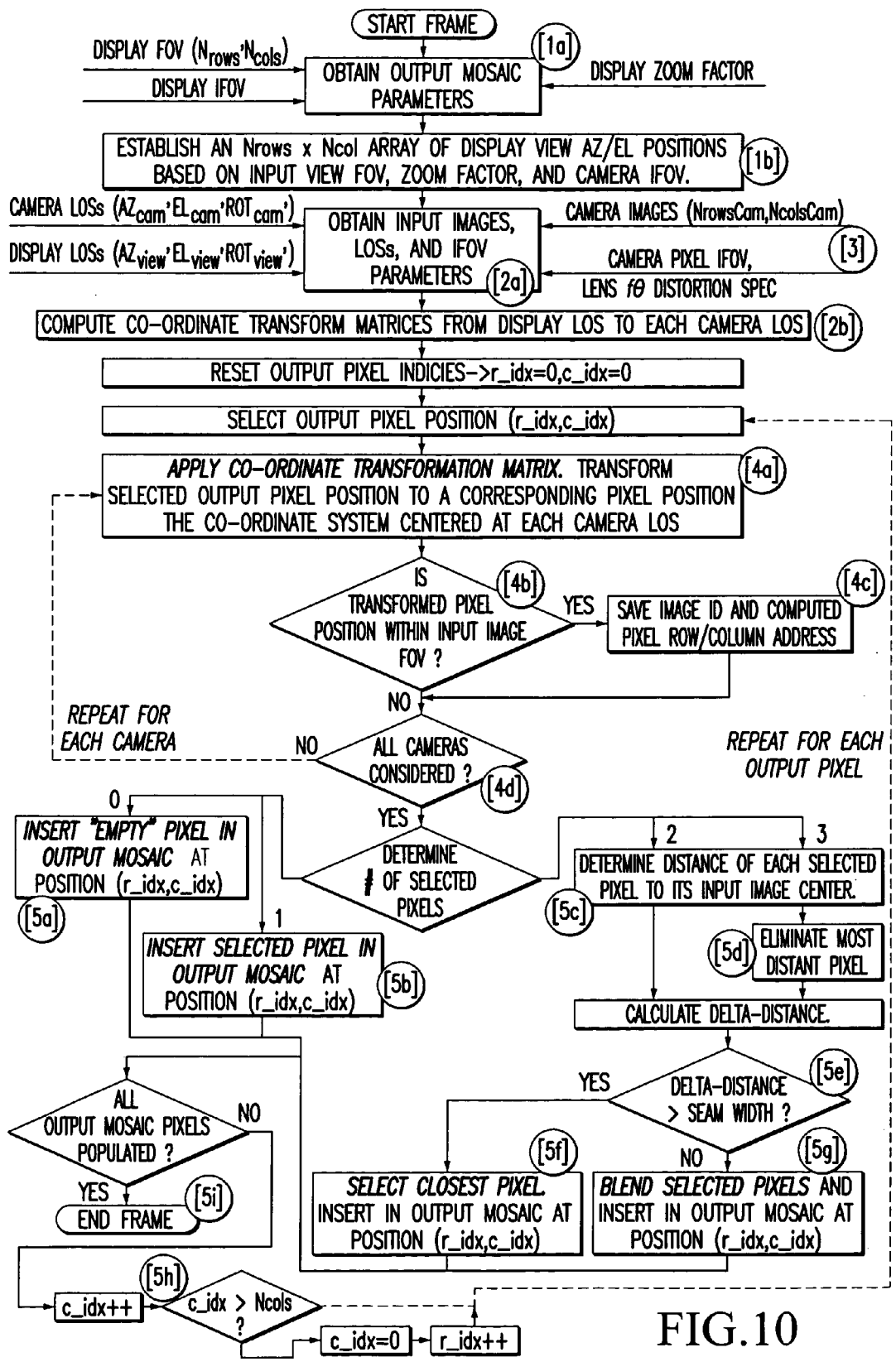
FIG. 10 illustrates another process to stitch an output mosaic from a plurality of input images according to an embodiment of the present invention.

FIGS. 9 and 10 represent an alternative perspective to the processing described with respect to FIGS. 2-8.

Figure 11:
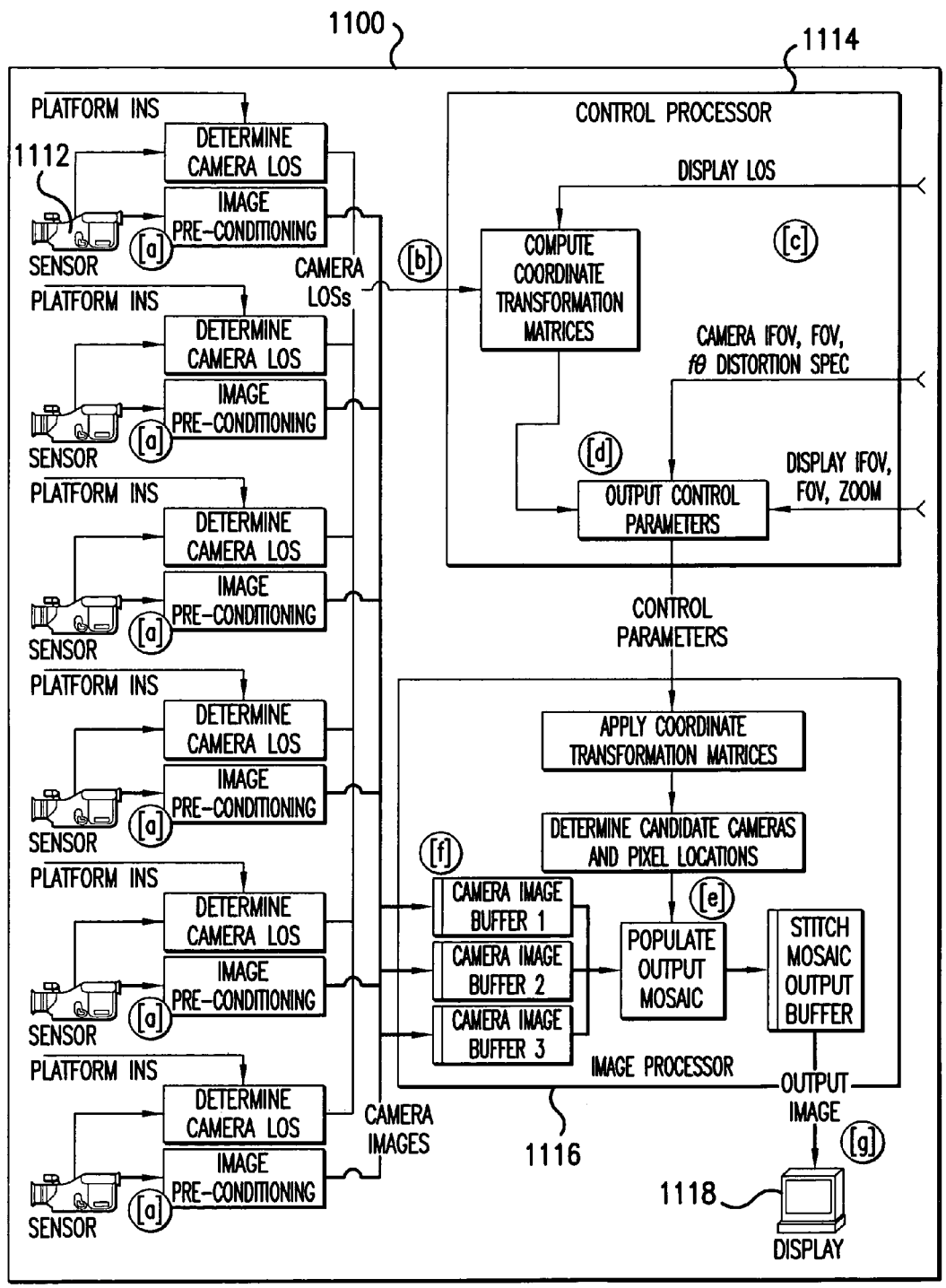
FIG. 11 illustrates a block diagram of an apparatus for stitching an output mosaic from a plurality of input images according to an embodiment of the present invention.

FIG. 11 illustrates a block diagram of an apparatus for stitching an output mosaic from a plurality of input images according to an embodiment. The apparatus 1100 may include a plurality of imaging sensors 1112. In this instance, there are six such imaging sensors, but the invention is not so limited. Each imaging sensor 1112 has associated parameters such as FOV, LOS, IFOV, distortion fθ and the like. The imaging sensors 1112 are configured to generate a plurality of images that may be utilized to generate the stitched output mosaic display as discussed in detail above.

The apparatus 1110 may also include a control processor 1114. The control processor 1114 may compute the transformation matrices for each input imaging sensor 1112 based on the platform INS and the display LOS of the output mosaic. The control processor 1114 may also calculate and output control parameters to an image processor 1116 based on the input parameters as shown. The processing steps to achieve these have been described in detail above.

The image processor 1116 may apply the coordinate transformation matrices, determine which input images (candidate cameras) will be utilized to generate the output mosaic, populate the output mosaic, and display the result to a display 1118. The image processor 1116 may blend the output pixels as necessary. The processing steps to achieve these results also have been described in detail above.

It should be noted that the imaging sensors 1112, the control processor 1114, and the image processor 1116 need not all be co-located in each other's vicinity. For example, the imaging sensors may be located on a plane with images relayed to a ground station that performs the processing. This may be relevant for systems that utilize unmanned aerial vehicles or remotely controlled vehicles.

The present invention and particularly the control processing and image processing generally relate to methods and an apparatus for performing the methods described herein. The apparatus may be specially constructed devices for the required purposes such as a digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of computer readable media suitable for storing electronic instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for image stitching, comprising:
   determining a virtual line-of-sight (LOS) and a corresponding field-of-view (FOV) of an output mosaic;
   obtaining a plurality of input images, wherein each image of the plurality of input images contributes to at least one output mosaic pixel; and
   mapping contributions from the plurality of input images for each output mosaic pixels comprising:
   for each input image of the plurality of input images determining whether the input image belongs to a collection of contributing images to the output mosaic pixel, and
   determining a value of the output mosaic pixel based on the collection of contributing images.

2. The method of claim 1, wherein the plurality of the input images are substantially simultaneously captured.

3. The method of claim 1, wherein a FOV of each image of the plurality of input images is directly adjacent to or overlaps a FOV of another one of the plurality of input images.

4. The method of claim 3, wherein:
   the plurality of input images are captured by a corresponding plurality of imaging sensors, and
   each of the plurality of imaging sensors has a LOS that is different from other imaging sensors.

5. The method of claim 1, wherein the step of determining whether the input image belongs in the collection of contributing images includes:
   determining whether the output mosaic pixel is within the input image; and
   including the input image in the collection of contributing images when it is determined that the output mosaic pixel is within the input image.

6. The method of claim 5, wherein the step of determining whether the output mosaic pixel is within the input image includes:
   determining whether the output mosaic pixel overlaps any portion of the input image.

7. The method of claim 6, wherein the step of determining whether the output mosaic pixel overlaps any portion of the input image includes:
   determining an incremental LOS and an incremental FOV of the output mosaic pixel; and
   determining whether the incremental LOS and FOV of the output mosaic pixel overlaps any portion of the input image.

8. The method of claim 5, wherein the step of determining whether the output mosaic pixel is within the input image includes:
   translating a position of the output mosaic pixel to a corresponding position of the input image; and
   determining whether the corresponding position of the input image is within a FOV of the input image.

9. The method of claim 8, wherein the step of translating the position of the output mosaic pixel to the corresponding position of the input image includes:

translating the output mosaic pixel from Euler AZ/EL coordinates to Cartesian FRD coordinates within a output display view coordinate system;
translating the FRD coordinates of the output mosaic pixel to a corresponding FRD coordinates of an input image view coordinate system; and
translating the output mosaic pixel from the FRD coordinates to corresponding Euler coordinates within the input image view coordinate system.

10. The method of claim 1, wherein the step of determining the value of the output mosaic pixel based on the collection of contributing images includes:
inserting an empty value for the output mosaic pixel when the collection of contributing images is empty;
determining an image contribution of each contributing image for the output mosaic pixel when the collection of contributing images is not empty; and
incorporating the image contributions of the contributing images for the output mosaic pixel when the collection of contributing images is not empty.

11. The method of claim 10, wherein the step of determining the image contribution of each contributing image includes:
transforming the output mosaic pixel into a corresponding position within the contributing image;
selecting a pixel within the contributing image that is closest to the corresponding position as a contributing pixel; and
determining the image contribution of the contributing image based on the contributing pixel.

12. The method of claim 11, wherein the step of determining the image contribution of each contributing image further includes:
determining if a number of contributing images in the collection of contributing images is more than a predetermined number; and
removing from the collection of contributing images one or more images so that the number of contributing images is equal to the predetermined number when it is determined that the number of contributing images in the list is more than the predetermined number.

13. The method of claim 12, wherein the step of removing images from the collection of contributing images includes:
determining a radial distance of the corresponding position of the output mosaic pixel from a center of the contributing image for each contributing image; and
removing from the collection of contributing images those images with the greatest minimum radial distances until the number of images of the collection of contributing images is equal to the predetermined number.

14. The method of claim 13, wherein the predetermined number is two.

15. The method of claim 14, wherein the step of determining the image contribution of the contributing image includes:
if a number of the contributing images is one:
providing a value of the contributing pixel as the image contribution of the contributing image; and
if the number of the contributing images is two:
determining a difference of the radial distances of the corresponding positions of the contributing pixels;
determining whether the difference of the radial distances of the corresponding positions of the contributing pixels is within a predetermined seam-width factor;
blending the output contributions of the contributing pixels if the difference is within the predetermined seam-width factor; and
providing the value of the contributing pixel with the closer radial distance and providing zero as the value for the contributing pixel with the further radial distance if the difference is not within the predetermined seam-width factor.

16. The method of claim 15, wherein the step of blending the output contributions of the contributing images includes:
determining a contribution weight for each contributing pixel of the contributing images based on the difference of the radial distances; and
providing as the image contribution the value of the contributing pixel multiplied by the contribution weight.

17. An apparatus for image stitching, comprising:
a control processor for determining a virtual line-of-sight (LOS) and a corresponding field-of-view (FOV) of an output mosaic;
a plurality of imaging sensors for generating a corresponding plurality of input images, wherein each image of the plurality of input images contributes to at least one output mosaic pixel of the output mosaic; and
an image processor for mapping contributions from the plurality of input images for each output mosaic pixel, wherein the image processor is configured for:
determining, for all of the plurality of input images, whether the output mosaic pixel is within a particular input image, and
including the particular input image in a collection of contributing images when it is determined that the output mosaic pixel is within the particular input image.

18. The apparatus of claim 17, wherein plurality of imaging sensors generate the plurality of the input images substantially simultaneously.

19. The apparatus of claim 18, wherein a FOV of each imaging sensor is directly adjacent to or overlaps a FOV of another imaging sensor.

20. The apparatus of claim 19, wherein each imaging sensor has a LOS that is different from other imaging sensors.

21. The apparatus of claim 17, wherein the image processor determines whether the output mosaic pixel is within the particular input image as follows:
translating the output mosaic pixel from Euler coordinates to equivalent Cartesian coordinates in an output mosaic coordinate system;
translating the Cartesian coordinates of the output mosaic pixel to a corresponding Cartesian coordinates in an input image coordinate system corresponding the input image; and
translating the output mosaic pixel from the Cartesian coordinates to corresponding Euler coordinates in the input image coordinate system; and
determining whether the corresponding Euler coordinates is within a FOV of the input image.

22. The apparatus claim 17, wherein the image processor maps contributions from the plurality of input images for each output mosaic pixel as follows:
inserting an empty value for the output mosaic pixel when the collection of contributing images is empty; and
determining and inserting an image contribution of each contributing image for the output mosaic pixel when the collection of contributing images is not empty.

23. The apparatus of claim 22, wherein the image processor determines the contribution of each contributing image as follows:
transforming the output mosaic pixel into a corresponding position within the contributing image;

selecting a pixel within the contributing image that is closest to the corresponding position as a contributing pixel;
determining if a number of contributing images in the collection of contributing images is more than a predetermined number;
removing from the collection of contributing images one or more images so that the number of contributing images is equal to the predetermined number when it is determined that the number of contributing images in the list is more than the predetermined number as follows:
determining a radial distance of the corresponding position of the output mosaic pixel from a center of the contributing image for each contributing image; and
removing from the collection of contributing images those images with the greatest minimum radial distances until the number of images of the collection of contributing images is equal to the predetermined number; and
determining the image contribution of the contributing image based on the contributing pixel.

24. The apparatus of claim 23, wherein the predetermined number is 2, and wherein the image processor determines the value of each output mosaic pixel as follows:
if a number of the contributing images for the output mosaic pixel is one:
providing a value of the contributing pixel of the contributing image as the value of the output mosaic pixel; and
if the number of the contributing images for the output pixel is two:
determining a difference of the radial distances of the corresponding positions of the contributing pixels;
determining whether the difference of the radial distances of the corresponding positions of the contributing pixels is within a predetermined seam-width factor;
feathering the output contributions of the contributing pixels if the difference is within the predetermined seam-width factor; and
providing the value of the contributing pixel having the closer radial distance as the value of the output mosaic pixel if the difference is not within the predetermined seam-width factor.

25. The apparatus of claim 24, wherein the image processor blends contributing pixels of two contributing images as follows:
determining a contribution weight for each contributing pixel of the contributing images based on the difference of the radial distances;
multiplying the value of each contributing pixel by the corresponding weight; and
adding the weighted values of the contributing pixels and providing the result as the value of the output mosaic pixel.

26. The apparatus of claim 17, wherein the control processor or the image processor or both are not co-located with the plurality of image sensors.

\* \* \* \* \*